(12) United States Patent
Berger et al.

(10) Patent No.: US 11,757,112 B2
(45) Date of Patent: Sep. 12, 2023

(54) HUMIDIFIER, FUEL CELL DEVICE HAVING A HUMIDIFIER, AND MOTOR VEHICLE

(71) Applicants: AUDI AG, Ingolstadt (DE); Volkswagen AG, Wolfsburg (DE)

(72) Inventors: Oliver Berger, Braunschweig (DE); Rune Staeck, Gifhorn (DE); Christian Lucas, Braunschweig (DE)

(73) Assignees: Volkswagen AG, Wolfsburg (DE); Audi AG, Ingolstadt (DE)

( * ) Notice: Subject to any disclaimer, the term of this patent is extended or adjusted under 35 U.S.C. 154(b) by 383 days.

(21) Appl. No.: 17/266,522

(22) PCT Filed: Jun. 28, 2019

(86) PCT No.: PCT/EP2019/067341
§ 371 (c)(1),
(2) Date: Feb. 5, 2021

(87) PCT Pub. No.: WO2020/030346
PCT Pub. Date: Feb. 13, 2020

(65) Prior Publication Data
US 2021/0320311 A1    Oct. 14, 2021

(30) Foreign Application Priority Data
Aug. 7, 2018 (DE) .................. 10 2018 213 153.8

(51) Int. Cl.
*H01M 8/04* (2016.01)
*H01M 8/04119* (2016.01)
*B01D 63/08* (2006.01)
*H01M 8/04029* (2016.01)

(52) U.S. Cl.
CPC ...... *H01M 8/04149* (2013.01); *B01D 63/082* (2013.01); *H01M 8/04029* (2013.01); *H01M 2250/20* (2013.01)

(58) Field of Classification Search
CPC ......... H01M 8/04149; H01M 8/04029; H01M 2250/20; B01D 63/082
USPC ...................................................... 429/413
See application file for complete search history.

(56) References Cited

U.S. PATENT DOCUMENTS

| 6,149,810 A * | 11/2000 | Gonzalez-Martin .... C25B 13/02 204/252 |
| 2005/0116365 A1* | 6/2005 | Yazawa ............. H01M 8/04126 261/104 |
| 2007/0281197 A1 | 12/2007 | Nishimura et al. |

(Continued)

FOREIGN PATENT DOCUMENTS

| DE | 11 2004 000 908 T5 | 4/2006 |
| DE | 10 2011 016 048 A1 | 10/2012 |

(Continued)

*Primary Examiner* — James M Erwin
(74) *Attorney, Agent, or Firm* — Seed IP Law Group LLP

(57) ABSTRACT

A humidifier has a plurality of humidifier modules that are clamped between end plates by tie rods and have a membrane that is permeable to water vapor, in which on both sides of the membrane there is respectively arranged a flow field frame having a multiplicity of webs defining a flow field. The tie rods are configured as hollow rods forming coolant tubes for a coolant to be led through. A fuel cell device and a motor vehicle having such a humidifier are also provided.

10 Claims, 6 Drawing Sheets

(56) References Cited

U.S. PATENT DOCUMENTS

| | | | | |
|---|---|---|---|---|
| 2008/0217795 A1* | 9/2008 | Gofer | ................ | H01M 8/04149 |
| | | | | 261/104 |
| 2010/0055525 A1 | 3/2010 | Uematsu et al. | | |
| 2012/0181712 A1 | 7/2012 | Vanderwees et al. | | |
| 2019/0131634 A1* | 5/2019 | Planque | ............ | H01M 8/04694 |
| 2021/0190339 A1* | 6/2021 | Glueck | .................. | F24F 13/08 |

FOREIGN PATENT DOCUMENTS

| | | | | |
|---|---|---|---|---|
| DE | 20 2013 009 357 U1 | 1/2015 | | |
| DE | 10 2013 221 881 A1 | 4/2015 | | |
| DE | 10 2014 218 330 A1 | 3/2016 | | |
| DE | 10 2016 113 740 A1 | 2/2018 | | |
| DE | 202016105309 U1 * | 2/2018 | .......... | B01D 63/082 |
| EP | 1 298 750 A1 | 4/2003 | | |
| EP | 1 366 535 B1 | 10/2004 | | |
| JP | 2000-357531 A | 12/2000 | | |
| JP | 2008-282555 A | 11/2008 | | |
| WO | 2017/102538 A1 | 6/2017 | | |

* cited by examiner

HUMIDIFIER, FUEL CELL DEVICE HAVING A HUMIDIFIER, AND MOTOR VEHICLE

BACKGROUND

Technical Field

Embodiments of the invention relate to a humidifier having a plurality of humidifier modules that are clamped between end plates by means of tie rods and have a membrane that is permeable to water vapor, in which on both sides of the membrane there is respectively arranged a flow field frame having a multiplicity of webs defining a flow field. Embodiments of the invention furthermore relate to a fuel cell device and a motor vehicle.

Description of the Related Art

Humidifiers are generally employed in the case of two gaseous media with different moisture content to achieve a transfer of the moisture to the drier medium. Such gas/gas humidifiers find application in particular in fuel cell devices, where air with the oxygen contained therein is compressed in the cathode circuit for the supplying of the cathode spaces of the fuel cell stack, so that relatively warm and dry compressed air is produced, the humidity of which is not sufficient for use in the fuel cell stack for the membrane electrode unit. The dry air provided by the compressor is humidified for the fuel cell stack by taking it along the water vapor-permeable membrane, the other side of which is washed in the moist exhaust air from the fuel cell stack. Furthermore, liquid water accrues in the fuel cell stack both on the anode side and the cathode side, and this must be removed from the fuel cell stack. The humidifier, the water separator, and the intercooler positioned downstream from the compressor are large components, resulting in a great increase in the required design space for a fuel cell device and reducing the efficiency of the fuel cell device because of large heat losses.

The applicant has already proposed the use of a humidifier having a plurality of humidifier modules, comprising webs which define a flow field, making possible a more uniform bathing of the membrane with the medium associated with this side. In such humidifiers, the humidifier modules are clamped by means of tie rods.

In DE 10 2016 113 740 A1 an air conditioning module is disclosed which provides a combination of a heat exchanger and a humidifier with small design space requirement and at the same time a large possible throughput, thanks to the arrangement of a first cross sectional area inside a second cross sectional area in a cylinder layout in one cross section of the air conditioning module.

WO 2017/102538 A1 describes a humidifier with integrated water separator, having a number of separate separator elements on one side of the membrane, in order to make possible an optimized moisture exchange between exhaust gas and operating media flows of a fuel cell.

BRIEF SUMMARY

Some embodiments provide a humidifier of the kind mentioned above with a cost-effective layout. Furthermore, some embodiments provide an improved fuel cell device and a motor vehicle having a greater efficiency.

In humidifiers described herein, tie rods are utilized to fulfill a further function by a simple modification of the design layout of the tie rods. Namely, the tie rods are configured as hollow rods, so that they can be used as coolant tubes for a coolant to be led through them. It should be realized that the coolant can also be used to cool the media located in the flow fields, especially gases, when the coolant is colder than the medium in the flow field. However, the coolant flowing through the hollow rods as coolant tubes can also be charged with heat, so that a heat transfer and thus an energy supply is possible.

In terms of a simple construction, common ports may be associated with the plurality of hollow rods for the supply and drainage of the coolant. Further, at least the flow fields in the flow field frame may be made of a thermally conductive material, contributing to an improved heat exchange. This is also helped by the fact that the surface of the flow fields in order to increase the heat transfer area is enlarged by structures chosen from the group including ribs, fins and wings. The thermally conductive material is formed by a metal or a plastic having a thermally conductive, metallic filling.

Furthermore, it is favorable for the hollow rods to be sealed off by gaskets against the flow fields, the gasket being chosen from a group including O-rings, liquid-sensitive expansion gaskets, adhesive gaskets, and joint sealant material. The adhesive gaskets can be easily installed when manufacturing the humidifier, while alternatively or additionally it is also possible to place a material which expands greatly when wet in the holes of the membrane and/or flow field frame receiving the tie rods, so that when the humidifier is used for the first time the material swells up and acts as an expansion gasket to provide the sealing effect.

An improved fuel cell device having a fuel cell comprising a membrane electrode arrangement, the electrode spaces of which can be supplied with reactants by reactant feed lines and having reactant exhaust gas lines, is achieved by connecting a humidifier as described above into the flow path of at least one of the reactant feed lines and the corresponding reactant exhaust gas line, such as on the cathode side, so that the humidifier can be used for the conditioning of the cathode gas.

Special advantages are achieved when the improved fuel cell device is installed in a motor vehicle, where the coolant circuit of the air conditioner includes the hollow rods of the humidifier, so the gas coming from the compressor and flowing through the humidifier can be temperature-controlled. If water reservoirs are provided in the humidifier, the stored water can be additionally temperature-controlled with the coolant, so that the latter is more easily evaporated and can thus help in humidifying the fuel cell stack.

BRIEF DESCRIPTION OF THE SEVERAL VIEWS OF THE DRAWINGS

Further benefits, features and details will emerge from the claims, the following description, and the drawings.

DETAILED DESCRIPTION

Figure 1:
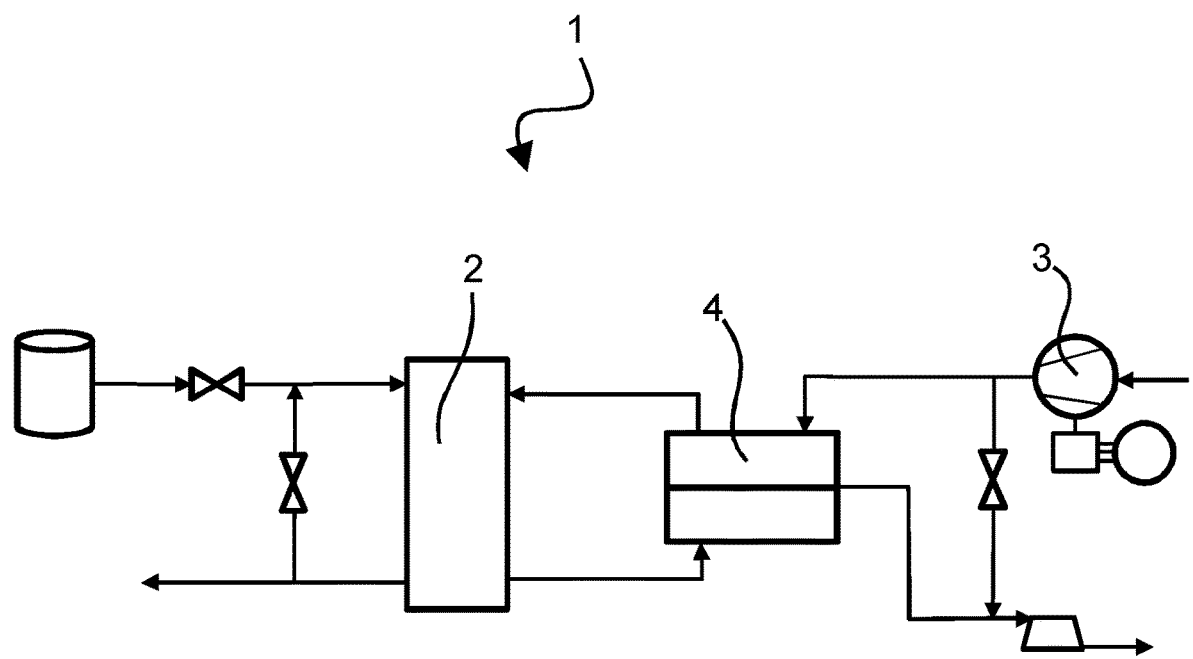
FIG. 1 illustrates a fuel cell device comprising a humidifier.

FIG. 1 shows a portion of a fuel cell device 1 comprising a mechanism for regulating the humidity of a plurality of fuel cells combined in a fuel cell stack 2.

Each of the fuel cells comprises an anode, a cathode, as well as a proton-conducting membrane separating the anode from the cathode. The membrane is formed from an ionomer, such as a sulfonated tetrafluoroethylene polymer (PTFE) or a polymer of perfluorinated sulfonic acid (PFSA). Alternatively, the membrane can be formed as a hydrocarbon membrane.

In addition, a catalyst can be mixed in with the anodes and/or the cathodes, the membrane being coated on its first side and/or on its second side with a catalyst layer made of a precious metal or a mixture containing precious metals such as platinum, palladium, ruthenium or the like, serving as a reaction accelerator in the reaction of the particular fuel cell.

Above an anode space, fuel (such as hydrogen) can be supplied to the anode. In a polymer electrolyte membrane fuel cell (PEM fuel cell), fuel or fuel molecules are split up into protons and electrons at the anode. The PEM lets the protons pass through, but it is not permeable to the electrons. For example, the reaction $2H_2 \rightarrow 4H^+ + 4e^-$ occurs at the anode (oxidation/electron transfer). While the protons pass through the PEM to the cathode, the electrons are taken by an external circuit to the cathode or to an energy accumulator.

Above a cathode space, the cathode gas (such as oxygen or air containing oxygen) can be supplied to the cathode, so that the following reaction occurs at the cathode side: $O_2 + 4H^+ + 4e^- \rightarrow 2H_2O$ (reduction/electron uptake).

In order to ensure an ionic conductivity for hydrogen protons through the PEM, the presence of water molecules in the PEM is required. Therefore, the cathode gas in particular is humidified before being supplied to the fuel cell, in order to achieve a moisture saturation of the PEM.

Since multiple fuel cells are assembled in the fuel cell stack 2, a sufficiently large amount of cathode gas must be made available, and therefore a large cathode gas mass flow is provided by a compressor 3. Because of the compressing of the cathode gas, its temperature is greatly increased. The conditioning of the cathode gas, i.e., its adjustment to the desired parameters in the fuel cell stack 2, occurs in an intercooler and in a humidifier 4.

Figure 3:
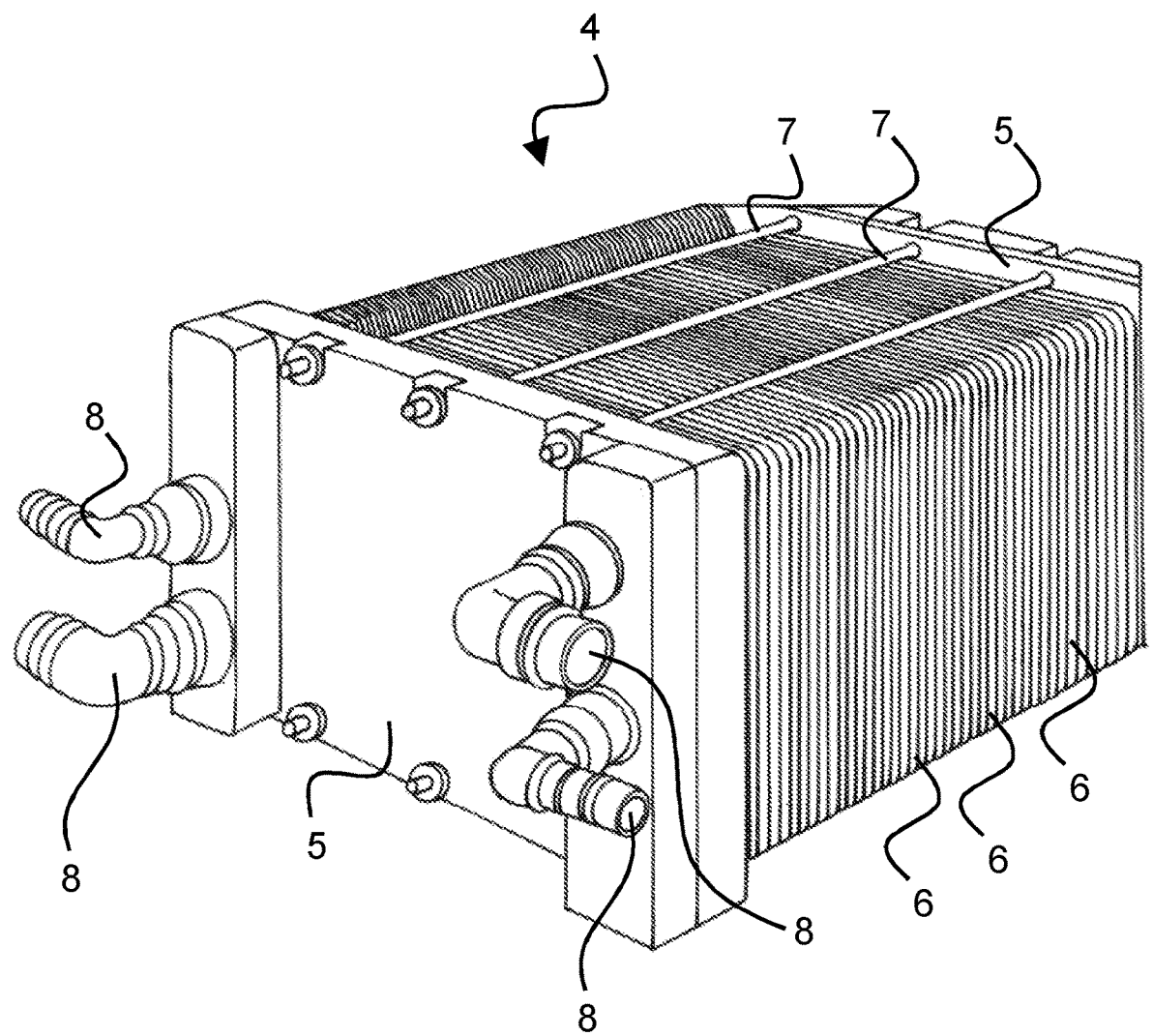
FIG. 3 illustrates a humidifier with a plurality of humidifier modules, arranged between end plates having media ports and clamped by tie rods.

The humidifier 4 shown as an exemplary embodiment in FIG. 3 comprises two end plates 5, between which a plurality of humidifier modules 6 are arranged, the humidifier modules 6 being clamped between the end plates 5 by tie rods 7. In the exemplary embodiment shown, for a more simple representation, the media ports 8 for the supply and drainage of the two media have been associated with one of the end plates 5, while in the case of a fuel cell device 1 the two media differ only in terms of their moisture content, but physically are generally present as air. In general, however, it is possible to arrange the media ports 8 for one of the media together at one of the end plates 5 or separately at the two end plates 5, and to arrange the media ports 8 for the other medium together on the same or on the other end plate 5 than the media ports 8 for the first medium or separately at the two end plates 5 with inverted order of the media ports 8 for the supply and the drainage as compared to the first medium, i.e., the humidifier modules 6 arranged in series can have a U-shaped or Z-shaped flow of a medium, and in the case of the two media considered together an opposite flow or a crossing opposite flow is also possible.

Figure 2:
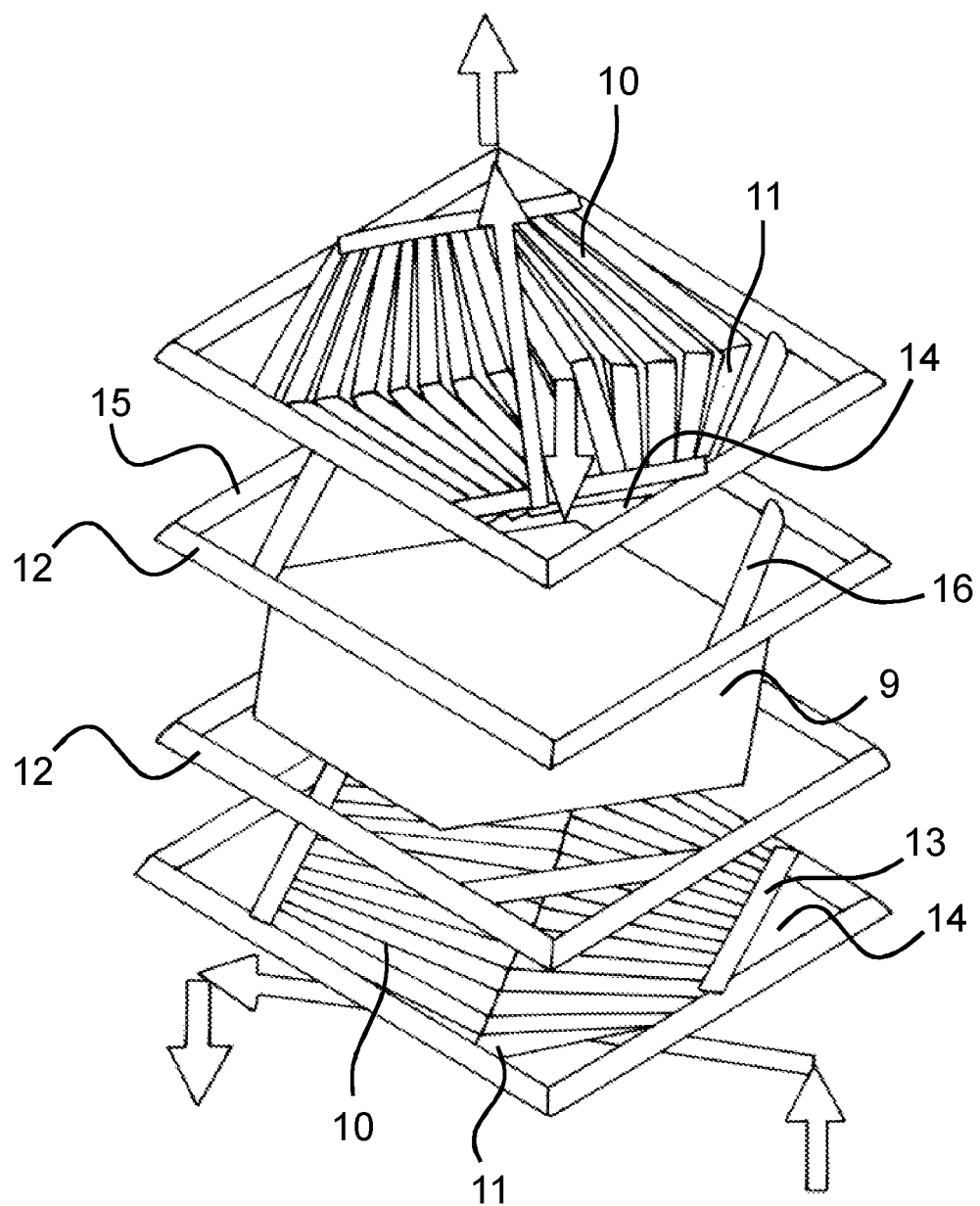
FIG. 2 illustrates an exploded diagram of a humidifier module in the sequence of flow field frame, gasket, membrane, gasket, and membrane.

FIG. 2 shows the layout of an individual humidifier module 6. On either side of the membrane 9 there is arranged respectively a flow field frame 10 with a plurality of webs 11 defining a flow field and a gasket 12 is arranged between each of the flow field frames 10 and the membrane 9, so that a sequence of flow field frame 10-gasket 12-membrane 9-gasket 12-flow field frame 10 results for the unit of a humidifier module.

The flow field frame 10 and the webs 11 here have the same height extension, while a connector 13 with lesser height extension than the webs 11 is arranged in the flow field frame 10 on either side of the webs 11, which is connected on the inside of the flow field frame 10 across the corner to two adjacent legs. Thus, this connector 13 provides a collector 14 for the medium in the corner, and thanks to the low height extension of the connector 13 the medium is distributed from this collector 14 between the webs 11 to generate the flow field. Since the webs 11 have the same height as the flow field frame 10, an exchanging of the medium between the webs 11 is not possible and the medium is uniformly distributed in the flow field over the entire area of the membrane 9. Moreover, because the webs 11 have the same height as the flow field frame 10, the webs 11 also provide a buttressing of the membrane 9 and increase the mechanical stability of the overall humidifier module 6.

The gaskets 12 are configured as a gasket frame 15 having two opposite cross connectors 16, being connected on the inside of the gasket frame 15 around the corner to two adjacent legs, the connectors 13 and the cross connectors 16 on one side of the membrane 9 being associated with complementary corners, and the membrane 9 having the form of a hexagon, whose sides are associated with the connectors 13, the cross connectors 16 and the frames 10, 15.

FIG. 2 thus shows that, in the case of the lower flow field frame 10 depicted in FIG. 2, the moist medium can be supplied in the right corner, taken via the connector 13 between the webs 11, and leave the flow field and the flow field frame 10 once more via the opposite corner. In the upper flow field frame 10 shown in FIG. 2, the run of the webs 11 is set off by an angle of 90 degrees from the run of the webs 11 in the lower flow field frame 10. The connector 13 in the upper flow field frame 10 in turn enables the supplying of the dry medium between the webs 11 and the drainage of the dry medium between the webs 11 from the opposite corner of the upper flow field frame 10.

It should be noted that a gas tightness between the two media and also against the outside is accomplished by virtue of the cross connector 16 associated with the gasket frame 15. Thus, separate supply channels and drainage channels exist for the two media between the end plates 5 for the humidifier modules 6 arranged in series.

The humidifier module 6 as a unit can also be sealed off as a whole from the outside in the area of the webs 11; alternatively, it is also possible for every two humidifier modules 6 to be assembled in a module pair and for the flow field frames 10 to be arranged on the facing side for the identical medium, so that identically produced humidifier modules 6 can be arranged in series without any exchange occurring from the flow field frame 10 for the moist medium in the adjacent flow field frame 10 for the dry medium.

The gasket 12 may be designed as an insert gasket, for which materials like PTFE or EPDM are suitable. For the membrane 9, the use of polymer membranes such as sulfonated membranes is conceivable; cotton membranes are likewise suitable.

Since the humidifier consists of multiple humidifier modules 6 clamped together by tie rods 7, it is possible to configure the tie rods 7 as hollow rods 17 forming coolant tubes in order to lead a coolant through them, being taken through common ports for the supply and drainage through the hollow rods 17. In order to improve the heat transfer at the gas side, the flow fields should be made from a thermally conductive material, especially a metal such as aluminum or steel. It is also conceivable to use a plastic with high thermal conductivity, where the high thermal conductivity of the plastic can be accomplished by metallic fillers.

Figure 4:
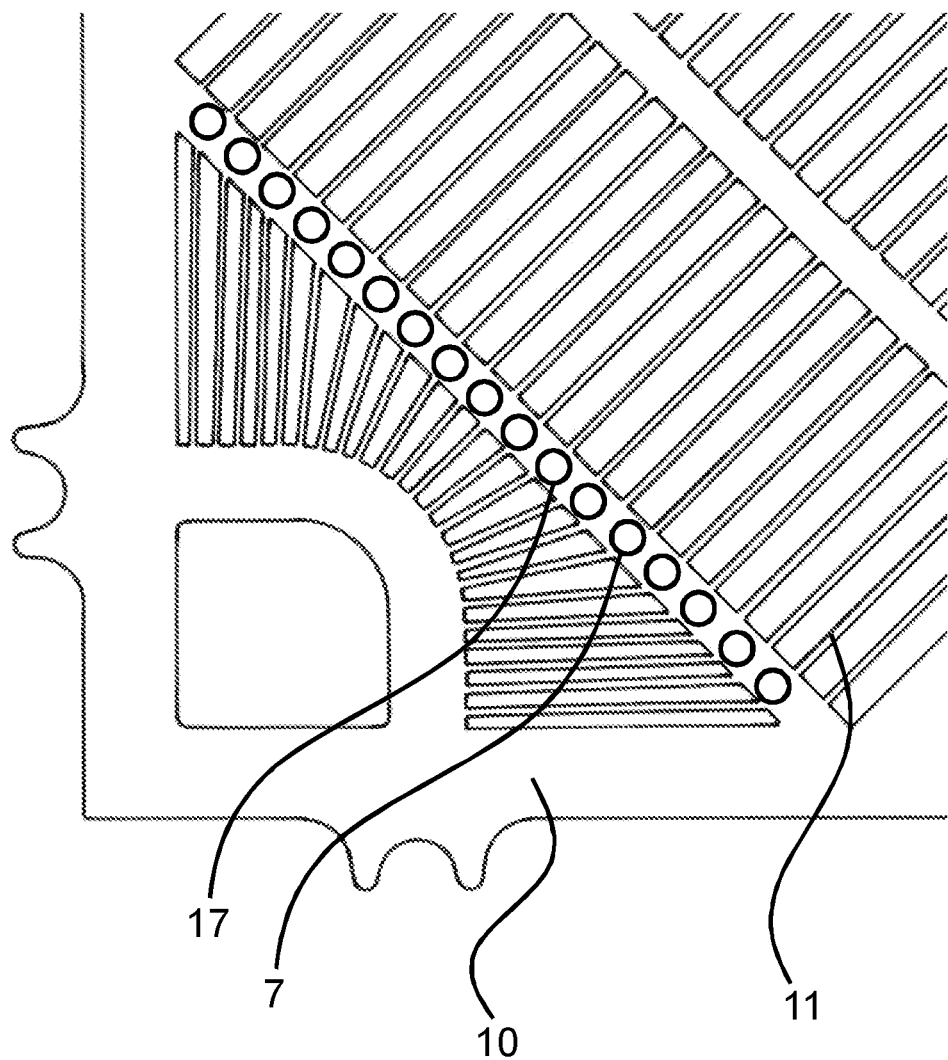
FIG. 4 illustrates an alternative embodiment of a flow field frame in a top view with passageways for hollow rods, shown partially broken.

FIG. 4 shows that, unlike the representation in FIG. 3, an arrangement of the tie rods 7 inside the humidifier 4 is also possible, the positioning of the hollow rods 17 as shown in FIG. 4 accomplishing an early gas preheating resulting in better water uptake.

Figure 5:
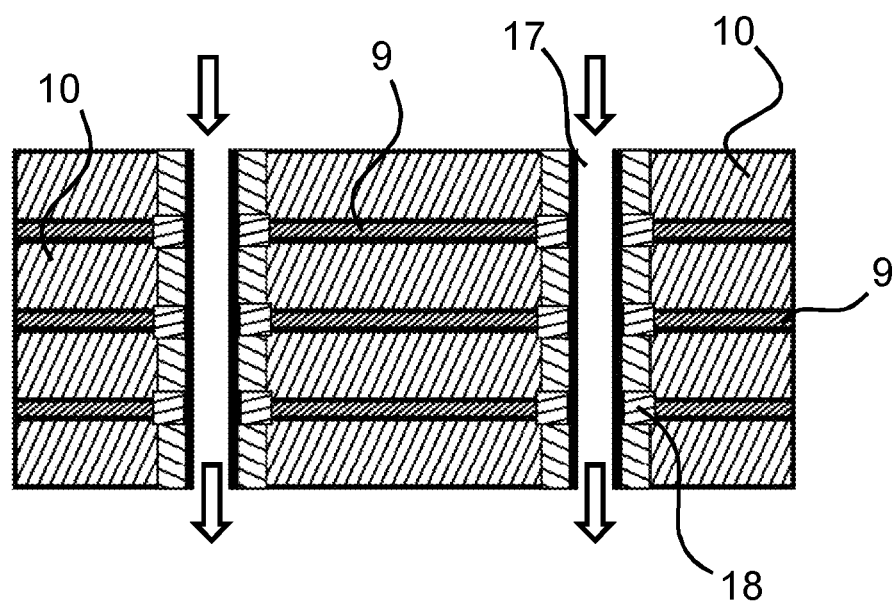
FIG. 5 illustrates a cross sectional view of the hollow rods passing through the flow field frame and the membrane.
Figure 6:
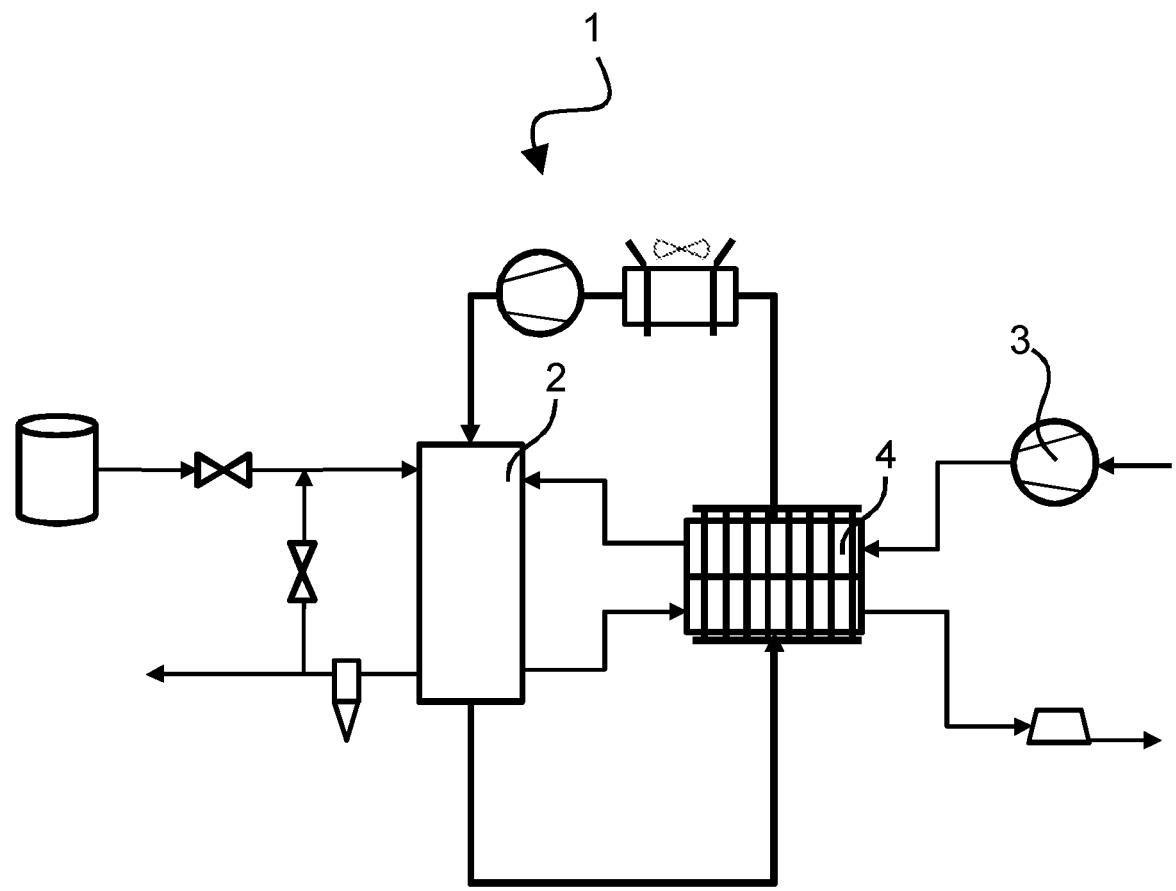
FIG. 6 illustrates a fuel cell device connected to a coolant circuit of a motor vehicle.

FIG. 5 shows that the hollow rods 17 are sealed off by gaskets 18 against the flow field frames 10 and the membrane 9, whereby a sealing action can be achieved by glue points or in simple manner by O-rings.

In the case of the fuel cell device 1 represented in FIG. 5, this is presumed to be used in a motor vehicle, the coolant circuit of the air conditioner being connected to the hollow rods 17 of the humidifier 4 in order to control the temperature of the gas flowing through the humidifier 4 and improve the efficiency of the fuel cell device 1 and that of the motor vehicle as a whole by utilizing the waste heat of the air conditioner. If water reservoirs are provided in the humidifier 4, the stored water can be additionally temperature-controlled with the coolant, and thus the latter is more easily evaporated to help in humidifying the fuel cell stack 2.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A humidifier, comprising:
   a plurality of humidifier modules that are clamped between end plates by tie rods, each of the humidifier modules including:
      a membrane that is permeable to water vapor;
      a first flow field frame having a first multiplicity of webs defining a first flow field arranged on a first side of the membrane; and
      a second flow field frame having a second multiplicity of webs defining a second flow field arranged on a second side of the membrane opposite to the first side of the membrane, and
   wherein the tie rods are hollow and form coolant tubes for a coolant to flow through the humidifier.

2. The humidifier according to claim 1, wherein common ports are associated with the hollow rods for supply and drainage of the coolant.

3. The humidifier according to claim 1, wherein at least the flow fields in the first and second flow field frames are made of a thermally conductive material.

4. The humidifier according to claim 3, wherein surfaces of the flow fields include structures chosen from the group including: ribs, fins, and wings.

5. The humidifier according to claim 3, wherein the thermally conductive material is formed by a metal or a plastic having a thermally conductive, metallic filling.

6. The humidifier according to claim 1, wherein the hollow tie rods are sealed off by gaskets against the flow fields and/or the membrane.

7. The humidifier according to claim 6, wherein the gasket is chosen from a group including: O-rings, liquid-sensitive expansion gaskets, adhesive gaskets, and joint sealant material.

8. A fuel cell device, comprising:
   a fuel cell including a membrane electrode arrangement, wherein electrodes of the membrane electrode arrangement are associated with electrode spaces which can be supplied with reactants via reactant feed lines and which comprise reactant exhaust gas lines; and,
   a humidifier connected to a flow path of at least one of the reactant feed lines or the reactant exhaust gas lines, the humidifier including:
      a plurality of humidifier modules that are clamped between end plates by tie rods, each of the humidifier modules including:
         a membrane that is permeable to water vapor;
         a first flow field frame having a first multiplicity of webs defining a first flow field arranged on a first side of the membrane; and
         a second flow field frame having a second multiplicity of webs defining a second flow field arranged on a second side of the membrane opposite to the first side of the membrane, and
      wherein the tie rods are hollow and form coolant tubes for a coolant to flow through the humidifier.

9. A motor vehicle comprising:
   an air conditioner including a coolant circuit and
   a fuel cell device including:
      a fuel cell having a membrane electrode arrangement, wherein electrodes of the membrane electrode arrangement are associated with electrode spaces which can be supplied with reactants via reactant feed lines and which comprise reactant exhaust gas lines; and
      a humidifier connected to a flow path of at least one of the reactant feed lines or the reactant exhaust gas lines, the humidifier including:
         a plurality of humidifier modules that are clamped between end plates by tie rods, each of the humidifier modules including:
            a membrane that is permeable to water vapor;
            a first flow field frame having a first multiplicity of webs defining a first flow field arranged on a first side of the membrane; and
            a second flow field frame having a second multiplicity of webs defining a second flow field arranged on a second side of the membrane opposite to the first side of the membrane,
      wherein the tie rods are hollow and form coolant tubes for a coolant to flow through the humidifier, and
      wherein the coolant circuit of the air conditioner incorporates the hollow tie rods of the humidifier.

10. The motor vehicle according to claim 9, wherein the humidifier includes a water reservoir in thermal contact with the hollow tie rods.

* * * * *